United States Patent [19]

Bouyoucos

[11] 4,207,962
[45] Jun. 17, 1980

[54] METHODS AND APPARATUS FOR USE IN GENERATING AND TRANSMITTING ACOUSTIC SIGNALS

[75] Inventor: John V. Bouyoucos, Rochester, N.Y.
[73] Assignee: Hydroacoustics Inc., Rochester, N.Y.
[21] Appl. No.: 921,399
[22] Filed: Jul. 3, 1978
[51] Int. Cl.² ............................................. G01V 1/14
[52] U.S. Cl. ..................................... 181/119; 367/41; 367/189
[58] Field of Search ....................... 181/119, 120, 114; 340/15.5 TA; 367/41, 189

[56] References Cited

U.S. PATENT DOCUMENTS

| | | | |
|---|---|---|---|
| 3,326,320 | 6/1967 | Forester | 340/15.5 TA |
| 3,840,090 | 10/1974 | Silverman | 181/119 |
| 4,064,481 | 12/1977 | Silverman | 181/119 |

OTHER PUBLICATIONS

"The Pulsed Vibrator as a Seismic Source", Evison, *Geophysical Prospecting*, vol. 5, No. 4, Dec. 1957, p. 381-391.

*Primary Examiner*—Howard A. Birmiel
*Attorney, Agent, or Firm*—Martin Lukacher

[57] ABSTRACT

Methods and apparatus describedmaximize, within a predetermined frequency band, the continuous or near-continuous transmission of broadband acoustic power into a medium having a finite tensile strength such as water or earth. Such methods and apparatus also minimize, for a given broadband acoustic power level in a given frequency band, the negative dynamic pressure or stress excursion of an acoustic signal with respect to the average pressure or stress present in the absence of the signal. Such signals may be transmitted for geophysical exploration purposes. The signals place the medium alternately under compressive and tensile stresses with respect to some average stress, where the time duration of the application of the compressive stress is short compared with the time duration of the application of the tensile stress. The tensile stress does not exceed the tensile strength of the medium or its interfaces. For highest efficiency, the minimum time duration of the compressive stress is in excess of one-half period of the upper frequency limit of the desired spectral band of the signal, while the maximum time duration of a contiguous tensile and compressive stress pair is approximately one period of the desired lower frequency limit of the band. The tensile stress waveform is preferably rectangular in shape.

31 Claims, 17 Drawing Figures

METHODS AND APPARATUS FOR USE IN GENERATING AND TRANSMITTING ACOUSTIC SIGNALS

The present invention relates to methods and apparatus for the generation and transmission of acoustic signals and particularly for the generation and transmission of seismic signals on land and in marine environments for geophysical exploration purposes.

This invention is related to the invention described in application Ser. No. 730,752, filed Oct. 7, 1976 in the name of John V. Bouyoucos, now U.S. Pat. No. 4,147,228 issued Apr. 3, 1979.

The invention is especially suitable for providing acoustic sources and methods for generating acoustic signal energy which produce a generally rectangular wave output suitable for use in coded transmissions which generate broad band spectral energy of controlled spectral shape. Such transmissions are particularly useful for geophysical exploration, while also being applicable for communication and other signalling purposes as well as generally for echolocation purposes.

In marine seismic exploration a broad band acoustic source such as an explosive charge, air gun or vibrator, is often used. Such source must be placed no deeper than one-half wavelength of the highest frequency of the signal energy of interest. This is done in order to avoid spectral nulls within the frequency band which is of interest. Such depth restriction limits the spectral level output of the source due to cavitation in the medium (the water) surrounding the source. This is particularly a problem for sources at shallow depths due to the propensity for cavitation or rupture of the liquid under tensile stress in the aerated water as is found near the surface, when the negative amplitude of the source pressure swing reaches approximately zero pressure. With a symmetrical signal, such as a signal with a sinusoidal waveform, the peak positive portion of the signal is limited to the amplitude of the negative portion for which cavitation occurs. When this limit is reached, the maximum power output of the source for a given depth has also been reached.

Similarly for a symmetrical signal source such as a sine wave source on land, which is biased against the surface of the earth with a suitable force, such as provided by the dead weight of the vehicle which transports the source, the maximum sine wave force can not exceed the dead weight force applied to the surface in order for the source to maintain continuous contact with the earth.

In many instances, it is not desirable even to approach closely the tensile strength of the medium during the negative swing of the signal. In liquid media, degassing or rectified diffusion can then occur, and at the surface of solid media incipient contacting can then result, contributing nonlinearities that distort the transmitted signal and degrade subsequent signal processing steps.

The invention provides a method of maximizing the signal power within the frequency band of interest, which method minimizes the limitations imposed by the finite tensile strength of the medium. The source and the method of generating the signals provided by the invention thus is particularly useful in coupling acoustic energy to media, such as the ground or water, which can not sustain a significant tensile force at the interface between the source and the medium, as for example at shallow depths in the ocean where negative pressures can produce cavitation, or along the surface of the earth where negative accelerations can cause intermittent contact (bouncing) between the source and the ground. Accordingly, cavitation and lift-off of the source from the ground are less restrictive in limiting the transmitted power. Alternatively, the method minimizes the required negative pressure or stress excursion of acoustic signals at a given broad band power level within a prescribed frequency band, thereby minimizing the opportunities for nonlinear behavior of the medium which would degrade the signal transmission process.

The invention is also suitable for use in the coded transmission of rectangular waves which produce broad band spectral energy of controlled spectral shape. Such coded transmissions may be generated in accordance with the methods and through the use of the apparatus described in a U.S. patent application Ser. No. 921,405 filed concurrently herewith in the name of David E. Nelson and assigned to the same assignee as this application. These transmissions consist of approximately rectangular waves in a quasi periodic train which is swept over an octave frequency band. The shape of the wave is adjusted to reduce or eliminate many of the non-octave harmonics, such as those with harmonic numbers 3n, where n is an integer. In particular, when the duration of the portion of the rectangular wave which produces a force on the medium in one direction is one third the period of the repetition frequency of the wave, the non-octave harmonics having harmonic numbers, 3n, are eliminated. A plurality of such rectangular waves may be generated by an array of several sources or a single source which is provided in accordance with the invention so as to produce a transmission over a frequency band containing several octaves above the octave of the fundamental sweep. Such transmissions have an autocorrelation function with a narrow main lobe and low side lobe energy which is especially suitable for use in producing high resolution seismograms by the correlation techniques known in the geophysical exploration art.

The signal produced in accordance with the invention is a generally rectangular wave with a positive portion having an amplitude substantially higher than the negative portion thereof with respect to its time average value. This asymmetrical wave is provided in accordance with the invention by an acoustic force generating source which produces a force on the medium in one direction which is substantially different from the force produced on the medium in the other direction, with respect to the time-average value of the force. This source may be called a bi-level force generator.

In the presence of tensile force constraints at the source-medium interface, the bi-level generator transmits more power to the medium without a rupture at the interface than can be transmitted by a symmetrical force generator, such as the vibrators used to generate sinusoidal waves. The spectrum level in the medium which is produced by a bi-level source may in a limiting case be 6 dB higher than the spectrum level of a sine wave producing an equal tensile stress at the interface and which is swept in frequency over the same band as occupied by the bi-level signals in the same time duration.

Bi-level sources in accordance with the invention may be hydraulically operated and have valves which switch pressures between high and low states, called supply pressure and return pressure. The supply and return pressures may be the pressures at the output side of a pump and the input of a reservoir in a hydraulic power supply. The switching of the pressures result in a switched force characteristic, because of which the source exhibits significantly higher efficiencies than a comparable source transmitting a sine wave in which analog control of the piston which is coupled to the load requires substantial pressure drops continuously across the valve metering orifices.

An array of bi-level sources may be used in a manner such that their outputs sum so as to transmit a series of coded trains, in accordance with the methods and means described in the above referenced application of David E. Nelson, for the purpose of controlling the spectrum across a given frequency band and for providing an autocorrelation function which exhibits low side lobe levels.

A single source may be provided in accordance with the invention which generates an n-level force, where n is equivalent to the number of bi-level sources which are combined. The n-level source may be provided by hydraulically switching pressures between supply and return pressure to apply n force levels to a piston which couples the forces to the medium. Separate valves can be used so as to individually control each of the forces whereby the n-level source can be used to transmit efficiently the coded signal trains whose composite spectrum and autocorrelation function is controlled in accordance with the code.

It is a feature of the invention to provide methods and apparatus which enable the generation and transmission of high power acoustic signals which exhibit low autocorrelation side lobe characteristics, high power transmission capability in the presence of weak interfaces, and the high efficiency of switched hydraulic pressures. The generators may be bi-level or n-level generators which then overcome many of the limitations of conventional generators which transmit symmetrical waveforms such as sinusoidal waves and which are limited in excursions by the tensile strength of the medium at the interface between the source and the medium (see for example, U.S. Pat. Nos. 3,106,982; 3,329,930; 3,363,720; 3,394,775; 3,430,727; 3,482,646; 3,840,090; and 4,049,077). Reference may also be had to U.S. Pat. No. 3,162,365 which describes a digital control system for translating digital signals hydraulically into corresponding analog displacements, but without regard to the generation of bi-level or n-level acoustic signals.

Accordingly, it is an object of the present invention to provide methods and apparatus for the generation and transmission of acoustic signals into a medium (either land or water) which methods and apparatus inject more power into the medium than can be provided with a sine wave or similar symmetrical signal when the signal amplitudes are limited by the tensile strength of the medium.

It is a further object of the invention to provide an improved source of acoustic signals having a power conversion efficiency which is higher than that of conventional acoustic sources.

It is a still further object of the invention to provide improved methods and apparatus for generating acoustic signals having waveforms which are suitable for coded transmissions which exhibit controlled spectral shape and controlled side lobe levels of the signal's autocorrelation function.

It is a still further object of the invention to provide improved sources of high power seismic signals which are light in weight, reliable, and easy to maintain.

Briefly described, the invention may be carried out for the transmission of acoustic signals into a medium having finite tensile strength by contacting the medium with a movable coupling member. Forces are applied to the member in opposite directions to place the medium alternately under compressive and tensile stresses with respect to the average pressure or stress present at the interface between the coupling member and the medium, with the time duration of the application of the compressive force short compared with the time duration of the application of the tensile force. The waveform of the tensile forces are approximately rectangular in shape and the signal has at least two levels (viz., is bi-level). The compressive force time duration is in excess of one-half period of the upper frequency limit of the band of the acoustic signal energy. The duration of a compressive and tensile force signal pair is the repetition frequency of the acoustic signal and represents the lower frequency limit of the band of the acoustic signal energy. The acoustic signals generally have repetition frequencies which are swept over a prescribed band such as an octave. Pseudorandom modulation of the repetition frequency is also possible. Preferably the amplitudes of the applied forces are controlled to cause the ratio of the amplitudes of the compressive and tensile forces to be inversely proportional to the time duration thereof. The source system remains in equilibrium nowithstanding that bi-level forces are transmitted.

The foregoing and other objects, features and advantages of the invention as well as the mode of operation and presently preferred embodiments thereof will be more apparent from a reading of the following description in connection with the accompanying drawings in which.

Referring first to FIG. 2(c) there is shown a sine wave force which modulates a static force which may be the bias weight of the transport vehicle for a vibrating seismic source or it may be a force proportional to the ambient (absolute) pressure at the depth under water where the vibrator is located. The force as a function of time, F(t), is symmetrical about the bias force $\overline{F}$ which bias force is also the average force and may be written $\overline{F}_{AVE}$.

A bi-level force is illustrated in waveform 2(b). This force is generated in response to a control signal E(t) which is illustrated in FIG. 2(a).

Figure 1:
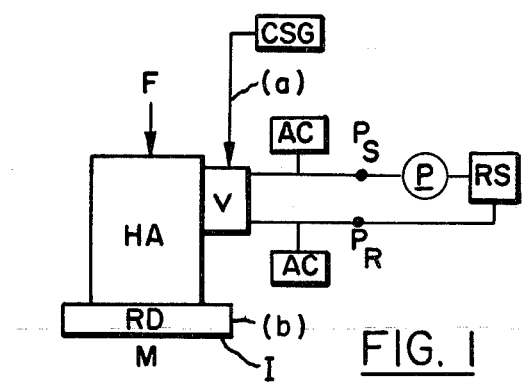
FIG. 1 is a block diagram schematically showing a seismic source which is configured to generate bi-level signals in accordance with the invention.

A source for generating the bi-level force is schematically shown in FIG. 1. The medium for receiving the acoustic signal, which may be either the ground or the water in case of a marine source, is indicated by M. A coupling member indicated by RD and the medium M define an interface I. A hydraulic actuator HA drives the coupling member RD toward and away from the medium M. A positive absolute static pressure is applied to the interface as represented by the bias force $\overline{F}$ on the actuator HA. A hydraulic power supply containing a pump P and a reservoir RS provide pressurized hydraulic fluid at supply pressure $P_S$ and return pressure $P_R$. This hydraulic power supply is coupled to an electrohydraulic valve V. Accumulators AC are closely coupled to the valve to maintain the pressures $P_S$ and $P_R$ approximately constant. The valve V is controlled by a control signal generator CSG which applies the electrical control signal E(t) to the valve, as shown in FIG. 2(a). These signals define the timing of the bi-level force signal generated by the source and transmitted into the medium M. The signal is rectangular in that the valve V switches the hydraulic actuating pressures in the hydraulic actuator HA between supply and return pressures, thereby enhancing the efficiency of operation of the source. The amplitudes of the force signals which vary between peak force $\hat{F}_+$ and $\hat{F}_-$, with respect to the average force $\overline{F}_{AVE}$, are provided by virtue of the operation of the hydraulic actuator HA. The positive portion of the signal $\hat{F}_+$ is in the direction toward the medium M and is a compressive force. The negative portion of the signal $\hat{F}_-$ is in the direction away from the medium with respect to $\overline{F}_{AVE}$. $\overline{F}_{AVE}$ may be either the bias weight of a vehicle pressing the source against the ground or a force proportional to the ambient (absolute) pressure at the depth a marine source is located.

FIG. 2(b) shows a presently preferred bi-level signal having a positive portion $\hat{F}_+$ of amplitude exceeding the amplitude of the negative portion $\hat{F}_-$. The time duration of the positive portion of the signal is short compared to the time duration of the negative portion. By definition, the time average of the signal is zero, namely $$\hat{F}_+(T_3-T_2)=\hat{F}_-(T_2-T_1) \tag{1}$$

The time duration of the positive or compressive portion of the signal is $T_3-T_2$. The time duration of the negative or tensile portion of the signal is $T_2-T_1$. The ratio of the amplitude of the positive and negative forces is in inverse proportion to their time durations, namely $$\frac{\hat{F}_+}{\hat{F}_-} = \frac{(T_2 - T_1)}{(T_3 - T_2)} \tag{2}$$

To avoid cavitation or lift-off at the source-medium interface, the signal must never go negative in force, with respect to the zero force axis. This is true both for the sine wave as for the bi-level signal. The limiting case is shown in FIGS. 2(b) and 2(c) where $\hat{F}_-$ is equal to $\overline{F}_{AVE}$, i.e., the assumed tensile strength of the interface.

The maximum power outputs for the sine wave and bi-level signals are given in equations (3) and (4) below, setting $\hat{F}_- = F_{AVE}$ $$W_{sine\,wave} = \frac{B}{2} (F_{AVE})^2 \tag{3}$$

$$W_{bi\text{-}level} = B\left[ (F_{AVE})^2(T_2 - T_1) + \left(\frac{\hat{F}_+}{\hat{F}_-}\right)^2 (F_{AVE})^2(T_3 - T_2)\right] \frac{1}{(T_3 - T_1)} \tag{4}$$

$$= B\,(F_{AVE})^2 \left[\frac{T_2 - T_1}{T_3 - T_1} + \left(\frac{\hat{F}_+}{\hat{F}_-}\right)^2\left(\frac{T_3 - T_2}{T_3 - T_2}\right)\right]$$

In the limiting case where the duration $(T_2-T_1)$ is about equal to the period of the signal $(T_3-T_1)$, which corresponds to a short positive pulse with $(T_3-T_2)<<(T_3-T_1)$, the bi-level maximum power is, as an approximation $$W_{bi\text{-}level} \simeq B\,(\overline{F}_{AVE})^2\left[1 + \frac{\hat{F}_+}{\hat{F}_-}\right] \tag{5}$$

In this limiting case, the ratio of the bi-level maximum power to the maximum sine wave power is $$\frac{W_{bi\text{-}level}}{W_{sine\,wave}} = 2\left[1 + \frac{\hat{F}_+}{\hat{F}_-}\right] \tag{6}$$

This power ratio tends toward infinity as the time duration of the positive pulse tends toward zero. It can be shown that in the case of a train of bi-level signals the spectrum level of the signal approaches an increase of 6 dB over the spectrum level of the corresponding sine wave as the ratio $\hat{F}_+/\hat{F}_-$ becomes large.

Thus, the bi-level signal, constrained to the same rupture threshold on the negative polarity as the sine wave exhibits an increasing power output relative to the sine wave in the ratio of $\hat{F}_+/\hat{F}_-$, and an enhanced spectrum level.

Figure 3:
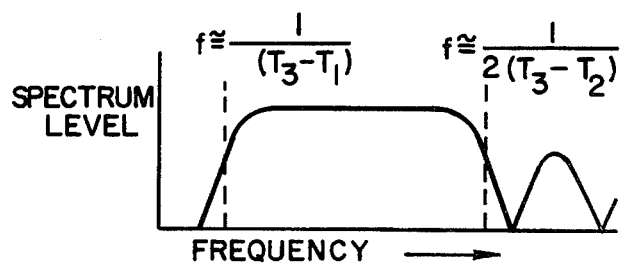
FIG. 3 is a graphical presentation of the spectrum of a bi-level signal element which is generated in accordance with the invention.

As shown in FIG. 3 the band width of a signal element depends upon the time duration of the positive and negative portions of that element. In FIG. 2(b) a signal element is the waveform within the time interval $(T_3-T_1)$. The positive or compressive force time duration $(T_3-T_2)$ is approximately one-half the period of the upper frequency limit to the flat portion in the spectrum of the signal element. The time duration of the total signal $(T_3-T_1)$ is approximately one period of the lower frequency limit in the spectrum of the signal element. These frequency limits are defined at the 3 dB down points of the spectrum level as the level varies with frequency. When the signal element is repeated in time, the spectrum of FIG. 3 becomes the envelope of a line spectrum where the individual lines are spaced apart a distance equal to the repetition frequency. When the repetition frequency is swept, such as over an octave, a continuous spectrum re-emerges with undulations as noted in the above referenced co-pending application, Ser. No. 730,752.

The preferred form of the bi-level signal is the one which results in the elimination or reduction of non-octave harmonics when the repetition frequency of the signal is swept across an octave frequency range. In this case, it is desired that the time duration of the positive portion $(T_3-T_2)$ be one-third of the repetition period $(T_3-T_1)$. Each signal element, by which is meant the waveform over any period of the signal, is constructed to maintain the same ratio $\hat{F}_+/\hat{F}_-$. Furthermore, the absolute value of $\hat{F}_-$ is held constant.

As described in the above referenced application of David E. Nelson, a grouping of such bi-level signals, all of which are swept across the fundamental octave band simultaneously and which have the same ratio of positive and negative portion time durations, are selected to have relative time displacements which cause the non-octave harmonics of the spectrum to be reduced or eliminated. Additional bi-level signals which sweep the octave harmonic bands may be added to augment the spectrum and achieve the desired spectral shape within the band. A flat spectrum may be generated over a frequency band which may be a number of octaves in extent. The time displacement of the trains are obtained by means of a control signal generator which produces control signals for the valves, which signals are coherent with a common clock. Programmable pulse generators may be used. The absolute amplitude of each bi-level signal is a function of the design of the hydraulic actuator which generates that signal and may be obtained by selecting appropriate drive areas on the piston which drives the coupling member in the actuator as will be explained hereinafter. The trains of signals may be transmitted by separate sources or by means of a n-level source, such as described herein in connection with FIGS. 14 to 17.

Figure 4:
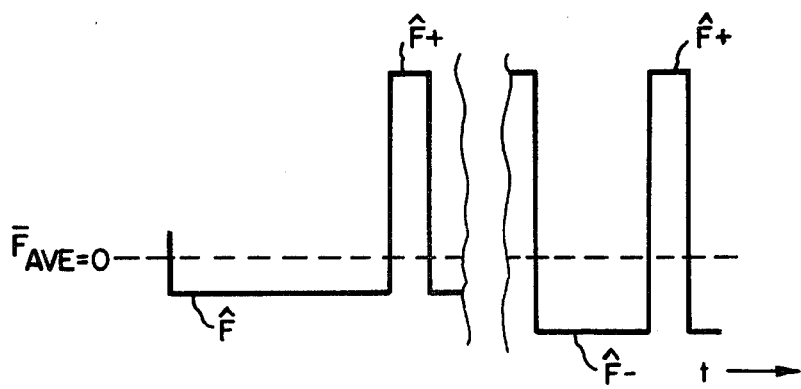
FIGS. 4 and 5 are waveforms of bi-level signals, the repetition frequency of which is swept over an octave frequency range.
Figure 5:
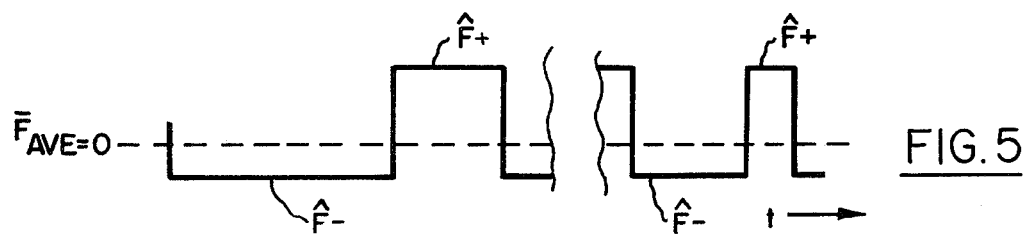

Referring to FIGS. 4 and 5 there are shown two bi-level signals whose repetition periods are swept over an octave. FIG. 4 shows the case where the peak positive force $\hat{F}_+$ and the time duration of pulse width of the positive force remains constant over the sweep. In order for the time average of the signal to be zero, the peak negative force $\hat{F}_-$ varies over the sweep.

In FIG. 5 the bi-level signal also sweeps an octave, but the pulse width of the positive portion varies in inverse proportion to the repetition period. Both the positive and negative portions $\hat{F}_+$ and $\hat{F}_-$ remain constant over the sweep. In the case of the signal shown in FIG. 5, the transmitted power into the medium is constant over the sweep. The bi-level signal shown in FIG. 5 is presently preferred and is compatible with the signal designs which are disclosed in the above referenced application of David E. Nelson which enables the provision of seismic signal energy of the desired spectral shape within the band to achieve low side lobe levels on the autocorrelation function thereof.

Figure 2:
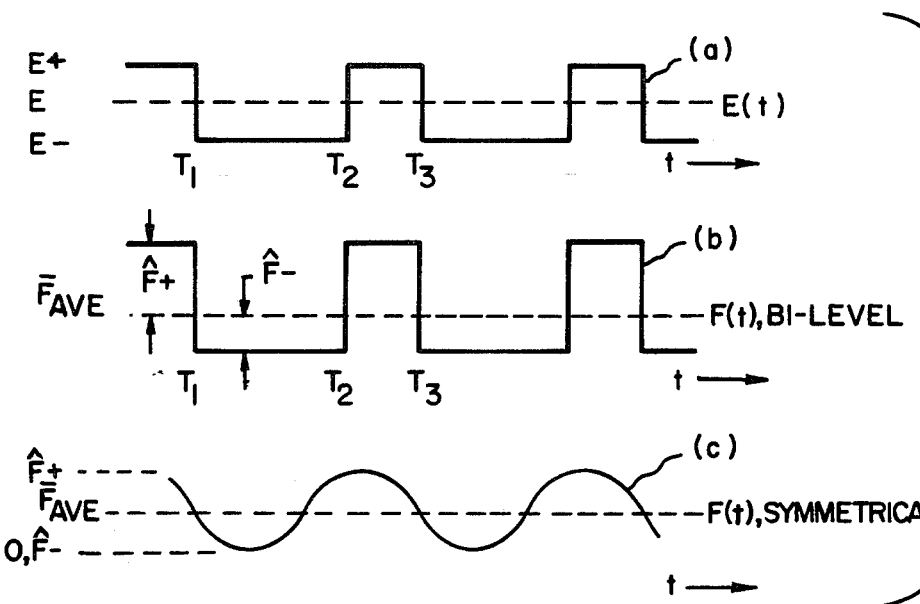
FIG. 2 is a series of waveforms which illustrate bi-level forces and also sinusoidal, symmetrical forces.

It will be observed from FIG. 2 that the rectangular bi-level signal maximizes the power into the medium for given medium tensile strength. This tensile strength may be referred to generally as a threshold constraint. The rectangular waveform enables the negative polarity force to be maintained at the threshold value for as long a time as is consistent with the bandwidth constraints on the signal. This enables the maximum permissible negative force-time product (area under the wave) to be developed which then allows the maximum positive force-time product, since the areas under the two halves of the wave average to zero. The negative portion of the signal should be rectangular in shape to achieve the maximum negative area. The positive going portion may be rectangular as shown in FIG. 2(b) and in FIGS. 4 and 5. However, triangular, half-cosine or other shapes may be used when desired in order to appropriately shape the spectral energy within the prescribed bandwidth. The rectangular wave for the positive polarity portion is preferred for reason of power conversion efficiency, since it enables the hydraulic actuator (HA, FIG. 1) to act as a switching amplifier which provides maximum efficiency.

Figure 6:
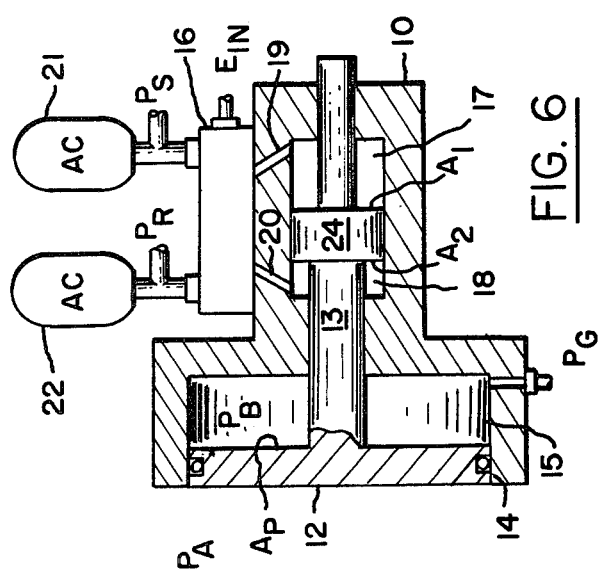
FIG. 6 is a diagrammatic sectional view of a seismic source embodying the invention for use in marine environments.

Referring next to FIG. 6 there is shown a bi-level seismic signal source for use in marine environments. The source has a housing 10. A coupling member in the form of a piston 12 forms the interface with the water medium at the outer surface thereof. The piston 12 is sealed along its edge 14 with respect to the housing 10 and the back surface of the piston 12 faces a cavity 15. Other seals are not shown to simplify the illustration. The housing 10 has another chamber which is divided into two variable volume regions 17 and 18 by a drive piston 24. The drive piston is connected to the coupling piston 12 by a shaft 13. Both pistons 12 and 24 and the shaft 13 are coaxial with each other. The drive piston is shown having two drive areas $A_1$ and $A_2$. A four-way electro-hydraulic valve 16 connects the hydraulic power supply to the drive regions 17 and 18 by passageways 19 and 20. Accumulators 21 and 22 are close coupled to the valve. The supply and return connections to the power supply are desirably made near the accumulator connections. The valve 16 provides a fast acting switch, switching the pressures in the drive regions 17 and 18 between the two pressure states $P_S$ and $P_R$. The valve may have a pilot stage which is electrically operated and a power stage which is hydraulically controlled by the pilot stage. The power stage portion of the valve 16 should be large enough to minimize any pressure drop across the valve ports when the valve is in any open state. Thus the pressure in the regions 17 and 18 will switch between supply and return pressures.

Electrical control signals $E_{IN}$ which may have waveforms such as shown in FIG. 2(a) are connected to the valve 16 and control the valve. Supply pressure is in the region 17 and return pressure is in the region 18 during the positive portion of the bi-level signal and apply an outward directed force to the water in a direction toward the interface. When the pressure in the drive region 18 is switched by the valve 16 to supply, the pressure in the other drive region 17 is switched to return, and a negative force in the inward direction, away from the interface is generated.

The cavity 15 is filled with gas, such as air, from a source of pressurized gas indicated as $P_G$. The pressure in the cavity 15 is set at a pressure $P_B$. For the embodiment of FIG. 6, $P_B$ is set equal to $P_A$ which is the ambient pressure of the surrounding water medium. The pressure $P_B$ may be higher than $P_A$ and is higher than $P_A$ in other embodiments of the marine source. One such embodiment is discussed hereinafter in connection with FIG. 7. In the embodiment shown in FIG. 6, the drive areas $A_1$ and $A_2$ on opposite sides of the drive piston 24 are unequal with area $A_1$ being larger than $A_2$.

The coupling piston 12 appears as a massive member, with the resonant frequency of the piston mass with the air stiffness of the cavity 15 being below the lowest operating frequency of interest. Accordingly, the acceleration of the piston is then proportional to the bi-level forces which drive it. The source as a whole is small compared to a wavelength at the frequencies of interest (which may be from about 10 to about 200 Hz). Thus, the far field acoustic pressure is proportional to the volume acceleration of the coupling piston, and to the bi-level forces which drive the coupling piston.

The radiated pressure P(t) on the axis of the piston 12 in the far field is given approximately by the expression $$P(t) = \frac{\rho}{4\pi r}[\dot{Q}(t)] \quad (7)$$

where $\rho$ is the density of water, r is the range to the observer in the far field and $\dot{Q}(t)$ is the volume acceleration of the coupling piston. Also $$\dot{Q}(t) = A_P[a(t)] \quad (8)$$

where a(t) is the linear acceleration of the piston and $A_P$ is its area. The piston linear acceleration is equal to the net force applied to the piston divided by the sum of the mass of the piston assembly, including the mass of the coupling piston 12, the shaft 13, the drive piston 24, and the mass of the fluid accession to inertia at the interface between the coupling piston 12 and the water medium. Inasmuch as the pressure in regions 17 and 18 are switched between supply and return, and as the areas $A_1$ and $A_2$ are unequal, the driving forces applied to the coupling piston will be unequal, and bi-level forces as shown in FIG. 2(b) will be developed. The acoustic pressure in the far field will also be bi-level, corresponding to a bi-level acoustic signal.

The time average of the bi-level forces applied to the piston 12 must be zero so that the piston will not migrate appreciably. The equilibrium of the system is then maintained over a transmission, which may include successive repetition of elements of the signal. Several hundred, say 200, of such elements may be provided as part of a transmission which sweeps over an octave in repetition frequency. The conditions of Equations (1) and (2) apply. $\hat{F}_+$ is the outward directed force on the piston 12 and $\hat{F}_-$ is the inward directed force. Then taking $P_R$ to be zero for simplicity $$\hat{F}_+ = (P_B - P_A)A_P + P_S A_1 \quad (9)$$

$$\hat{F}_- = -(P_B - P_A)A_P + P_S A_2 \quad (10)$$

Equation (9) applies in the state where the pressure $P_S$ has been switched to the region 17 and the pressure $P_R$ ($P_R=0$) has been switched to region 18. Equation (10) applies in the opposite state where pressure $P_S$ has been switched to region 18 and pressure $P_R$ has been switched to region 17. Let the ratio of the bi-level forces be expressed as $$\hat{F}_+/\hat{F}_- = K \quad (11)$$

Then inserting Equation (9) and Equation (10) into Equation (11) and solving for $P_B$, the result is $$P_B = P_S \frac{A_2}{A_P} \frac{\left(K - \frac{A_1}{A_2}\right)}{(K+1)} + P_A \quad (12)$$

Equation (12) sets forth the relationship between the various pressures and areas that enable the bi-level forces to be transmitted with the source remaining in equilibrium. In one preferred form of the source the ratio of the drive areas $A_1/A_2$ is equal to K. With this area ratio, and so long as K remains constant over the swept transmission, $P_B$ should be maintained equal to $P_A$.

Figure 7:
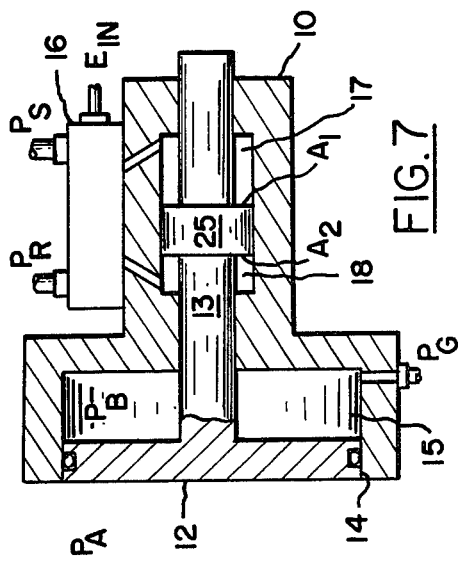
FIG. 7 is a diagrammatic view similar to FIG. 6 where the source has a somewhat modified hydraulic actuating means.

FIG. 7 shows the case where a source similar to the source shown in FIG. 6 is provided with a drive piston 25 having drive areas $A_1$ equal to $A_2$. Then the requirement for bi-level transmission is $$P_B - P_A = P_S \frac{A_2}{A_P} \frac{(K-1)}{(K+1)} \quad (13)$$

In the case where the positive or outward directed-compressive force has a time duration which is one-third of the period of the signal element, K equals 2. For the source shown in FIG. 7, then $$P_S A_2 = 3(P_B - P_A)A_P \quad (14)$$

Equation (14) shows that the hydraulic inward force on the piston during movement in a direction away from the interface (inwardly) is three times the outward pneumatic force which is developed on the surface of the coupling member which faces the cavity 15. The net inward force is then twice the pneumatic force. When the pressure is switched, the net outward force becomes four times the pneumatic force, leaving a net difference between the inward and outward forces of a factor of 2 which corresponds to the signal wave form for the code in which the 3n non-octave harmonic components are eliminated from the signal spectrum.

K may be changed over a sweep if it is desired to keep the time duration of the positive portion of the signal constant as is shown in FIG. 4. Then the pressure $P_B$ in the cavity 15 must also change over the sweep, as is shown by Equation (14). The cavity 15 may be a closed cavity and the piston may be shifted in its average position slightly to alter $P_B$. The gas filled cavity 15 then acts as an air spring providing a self-adjusting balance of the net forces on the piston 12. The sources provided by the invention, as illustrated in the cases shown in FIGS. 6 and 7, have the features of (a) switched force valving with high efficiency as compared to linear or analog valve operation; (b) balance of forces to enable the transmission of the bi-level signals without migration of the piston; and (c) increased power output under tensile stress limited conditions over sinusoidal and other symmetrical wave forms.

Figure 8:
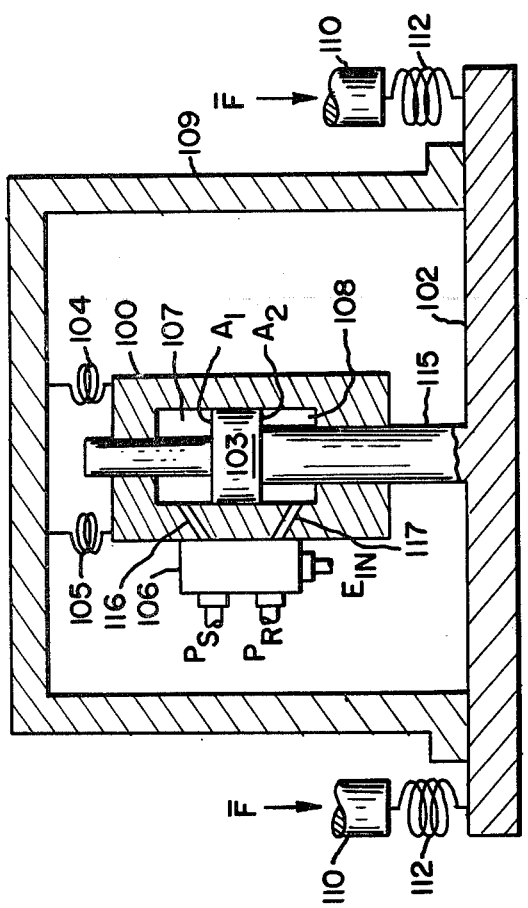
FIG. 8 is a sectional view diagrammatically showing a seismic source embodying the invention for use on land.
Figure 12:
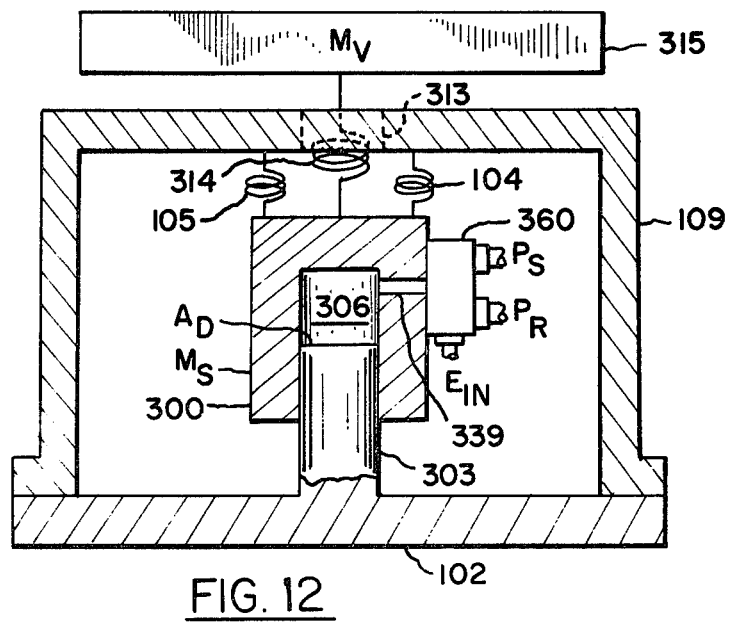
FIG. 12 is a sectional view diagrammatically showing a seismic source in accordance with a further embodiment of the invention, which source is adapted for use on land.

Referring to FIG. 8, there is shown a source for generating and transmitting the bi-level signals into a solid medium such as the ground. A member for coupling the signals into the ground is provided by a base plate 102. The downward surface of the plate forms the interface at the ground. A housing 100 which forms a reaction mass is suspended by springs from a yoke or frame 109 which is mounted on the base plate 102. The housing contains a drive piston 103 slidably disposed in a chamber in the housing 100. The piston divides the housing into upper and lower pressurized hydraulic fluid filled regions 107 and 108. An upper drive area $A_1$ which faces away from the interface is larger than a lower drive area $A_2$ on the piston 103. This lower drive area faces toward the interface. The piston 103 is rigidly connected to the base plate 102 by a shaft 115. Forces $\overline{F}$ which may come from the dead weight of a transport vehicle are applied to shafts 110 and isolating springs 112 to the base plate 102 and subject the interface to a positive absolute static pressure. The bias force may be applied alternatively or additionally by another mass which is connected to the housing 100 by isolating springs. Such a mass and isolating spring is illustrated in FIG. 12 as the mass 315 of $M_V$ and the spring 314.

The drive regions 107 and 108 are connected by passages 116 and 117 to a four-way electro-hydraulic valve 106 which is controlled by the signals which define the time duration of the positive and negative portions of the bi-level signals. The valve is connected to the hydraulic power supply and switches the pressures in the regions 107 and 108 between supply and return pressures as was explained in connection with FIG. 6.

The housing 100 is nominally centered with respect to the drive piston 103 by the springs 104 and 105 which serve as centering springs. When the valve 106 switches the pressures in regions 107 and 108 between $P_S$ and $P_R$, reaction forces on the housing 100 enable driving forces to be applied to the piston 103 to exert bi-level forces through the base plate 102 to the ground. The reaction forces are balanced and prevent the housing from migrating up or down with respect to the piston 103. The springs 104 and 105 provide a restoring force on the housing 100 tending to keep it centered with respect to the piston 103. By selecting the area ratio $A_1/A_2$, any nominal unidirectional loading on the springs 104 and 105 is minimized or eliminated. The springs correct for any drifting of the supply or return pressures or for any displacements in the switching times $T_1$, $T_2$ and $T_3$ which otherwise maintain the zero average amplitude condition as defined in Equations (1) and (2) above.

The dynamic forces on the base plate 102 are approximately equal to the dynamic forces on the housing 100. The total forces on the housing (assuming for purposes of this explanation that $P_R$ equals zero) are expressed as follows $$\hat{F}_+ = P_S A_1 - K_S X - M_S g \quad (15)$$

$$\hat{F}_- = P_S A_2 + K_S X + M_S g \quad (16)$$

In Equations (15) and (16), $K_S$ is the spring rate of the springs 104 and 105. X is the displacement of the housing 100 upward relative to the frame 109. $M_S$ is the mass of the housing 100. g is the acceleration of gravity. Equation (15) applies when $P_S$ has been switched to the upper region 107 and $P_R$ has been switched to the lower region 108. Equation (16) applies when $P_S$ has been switched to the lower region 108 and $P_R$ has been switched to the upper region 107. Again taking $P_R = 0$, and substituting K for the bi-level force ratio $\hat{F}_+/\hat{F}_-$ and solving for X in Equations (15) and (16) yields $$X = \frac{P_S A_2}{K_S} \frac{\left(\frac{A_1}{A_2} - K\right)}{(1+K)} - \frac{M_S g}{K_S} \quad (17)$$

If the area ratio $A_1/A_2$ is set equal to the bi-level force ratio K, the housing is displaced downward on the average by an amount equal to its own weight, stretching the springs 104 and 105. Alternatively, the ratio $A_1/A_2$ can be set relative to K, such that X=0. On average the springs 104 and 105 are then not stretched. The springs assume an increasing average stress and deflection if the bi-level signal is of the format shown in FIG. 4. It is preferred that the springs 104 and 105 as well as the spring 314 be relatively soft so that the resonant frequency of the housing mass and the spring stiffness is well below the lowest operating frequency of interest in the spectrum of the bi-level signals which are transmitted into the ground.

If K is set equal to $A_1/A_2$ in Equation 17, $K_S X = -M_S g$ and from Equations (15) and (16), $\hat{F}_+ = P_S A_1$ and $\hat{F}_- = P_2 A_1/K$. To avoid lift off of the base plate 102 from the ground, $\overline{F}_{AVE} \geq \hat{F}_-$. Thus, for a given positive force on the ground, $\hat{F}_+$, the bias weight requirement, $\overline{F}_{AVE}$, is inversely proportional to K. For K=2 the required bias weight is one-half of that required when K=1, for the same positive peak force applied to the ground. Alternatively, for the same bias weight, the bi-level signal with K=2 exhibits twice the positive force on the ground relative to the case of a symmetrical signal where K=1. With reference to Equations (3) and (4) it can be shown that the signal power delivered to the ground for the bi-level signal with K=2 is twice the power obtained in the case that K=1, for the same bias weight (and is four times the power of the equivalent maximum sine-wave signal).

With K set equal to $A_1/A_2$ in FIG. 8, the springs 104 and 105 are not subjected to significant average forces. However, if $A_1 = A_2$ in FIG. 8, the bi-level signal will apply static thrust against the springs on top of which the alternating thrust is applied. The springs are thus subjected to increased stress which may adversely affect their life. Thus, the preferred embodiment of the configuration of FIG. 8 is the case for which the area ratio $A_1/A_2$ is equal approximately to the bi-level force ratio K such that the seismic mass of the housing 100 is essentially balanced during operation and has minimal tendency to migrate. If the housing 100 does not have to migrate during dynamic operation, but can stay at an equilibrium position, the lengths of the cavities 107, 108 and hence their volumes can be minimized which is beneficial to the hydraulic system operation.

It is to be noted that the cavity 15 in FIGS. 6 and 7 can provide a spring-like equilibrium position maintaining or restoring function similar to the function of the springs 104, 105 in FIG. 8. For a chosen operating depth the cavity 15 can be charged at $P_G$ to provide nominally the correct interior pressure, $P_B$, for operation at a specified level with the piston properly centered. Should the piston tend to migrate one direction or the other from the equilibrium position, the value of $P_B$ will change in the direction to retard such migration.

The high value of $P_B$ relative to $P_A$ in FIG. 7 (see Equation (13)) is a manifestation of such balancing of average forces, and as the counterpart of the average thrust that is supported by the springs 104, 105 in FIG. 8 when $A_1 = A_2$.

Figure 9:
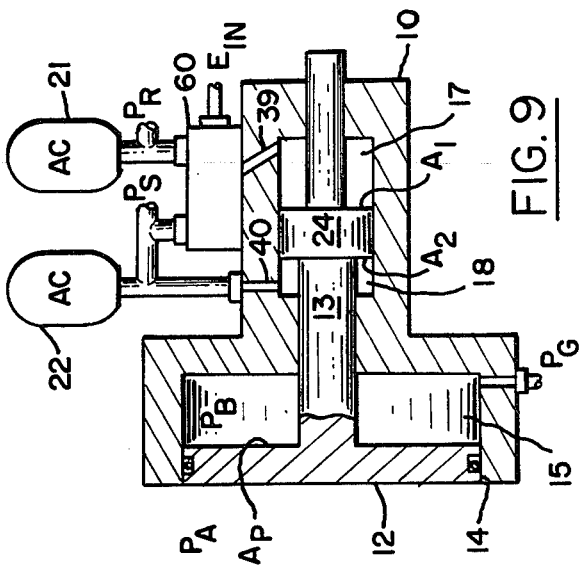
FIG. 9 is a view similar to FIG. 6 where the source utilizes a modified hydraulic pressure switching arrangement.

Referring to FIG. 9, there is shown another source for use in marine applications which is similar insofar as the design of the coupling piston housing and drive piston are concerned to the source shown in FIG. 6. The hydraulic actuating means utilize a three-way electrohydraulic valve 60 rather than a four-way valve as used in the source of FIG. 6. The cavity 18 is coupled continuously through a passage 40 to the supply pressure side of the hydraulic power supply and to the supply accumulator 22. The three-way valve 60 switches the pressure in the drive region 17 between supply and return pressures and is connected to that region by a passage 39. The three-way valve may be a spool valve having a pilot and power stage. It is desirable that the spool and the ports be somewhat larger than in the case of the four-way valve 16 (FIG. 6).

The balance equation for the source shown in FIG. 9 which is obtained in a manner similar to Equation (12) is $$P_B = P_S \frac{A_2}{A_P} \frac{\left(K + 1 - \frac{A_1}{A_2}\right)}{(K + 1)} + P_A \tag{18}$$

When K equals 2, which is the case for the signal format shown in FIG. 2(b), the balance conditions for equilibrium in the source with $P_B$ equal to $P_A$ is that the area ratio $A_1/A_2$ is equal to 3. Thus the area $A_1$ in the case of the drive piston 24 is 50% larger than the area $A_1$ in the case of the source shown in FIG. 6.

Figure 10:
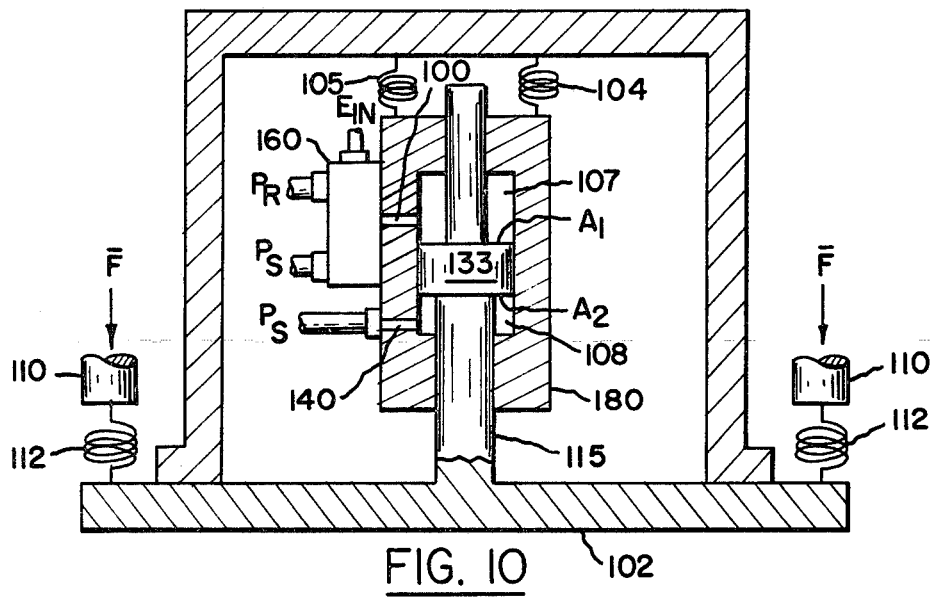
FIG. 10 is a view similar to FIG. 8 where the source utilizes a modified hydraulic pressure switching arrangement.

Referring to FIG. 10 there is shown a land source which is similar to the source shown in FIG. 8 but which utilizes a three-way electrohydraulic valve 160 which switches the pressure between $P_S$ and $P_R$ in the upper drive region 107. The lower drive region is in continuous communication with the supply pressure accumulator through the passage 140 as was illustrated in FIG. 9. For the hydraulic actuator using the three-way valve 160 the following balance equation is derived in a manner similar to Equation (17).

$$X = \frac{P_S A_2}{K_S} \frac{\left[\frac{A_1}{A_2} - (1 + K)\right]}{(1 + K)} - \frac{M_S g}{K_S} \tag{19}$$

It will be observed that a larger area ratio $A_1/A_2$ is needed to provide for appropriate balance conditions, than is the case for the source shown in FIG. 8.

Figure 11:
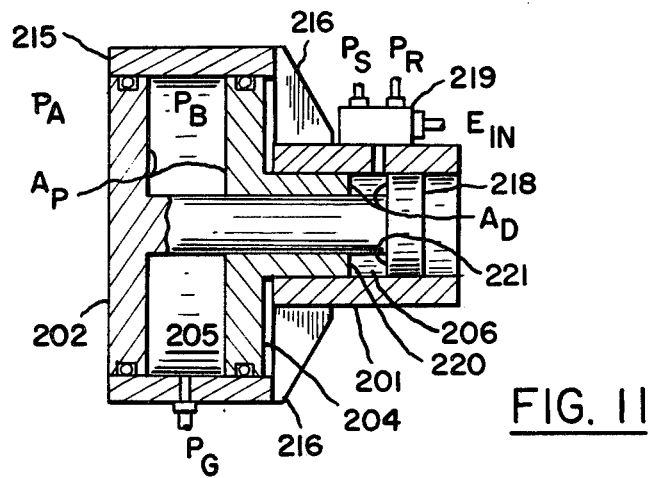
FIG. 11 is a sectional view diagrammatically showing a seismic source in accordance with another embodiment of the invention, which source is designed for use in marine environments.

Referring to FIG. 11 there is shown a marine source in which the coupling member is provided by two pistons 202 and 204 in back-to-back relationship. These pistons have equal areas exposed to a chamber 205 which is defined between them. This chamber is closed at the edges of the pistons 202 and 204 by a cylinder 215 in which they are slidably mounted. A housing cylinder 201 is connected by struts 216 to the cylinder 215. Alternatively a boot attached to the edges of the pistons may seal the chamber. The chamber 205 is a variable volume chamber and is filled with pressurized gas from a source indicated at $P_G$. A housing is provided by a cylinder 201 in which two coaxial shafts 203 and 220 extend. The outer coaxial shaft 220 is connected to the inner piston 204 and the inner coaxial shaft 203 is connected to the outer piston 202. An enlarged section 218 at the end of the inner coaxial shaft 203 forms a step 221 which is opposite to the end of the outer coaxial shaft 220. The end of shaft 220 and the step 221 present piston drive areas $A_D$ which are equal to each other to a chamber 206 in the housing. The coaxial shafts are slidable with respect to each other and also slidable with respect to the housing cylinder 201.

As the volume of the region between the piston drive areas $A_D$ increases, the volume of the cavity 205 decreases and vice versa. A three-way electrohydraulic valve 219 switches the pressure in the region 206 between $P_S$ and $P_R$ in accordance with the input signal $E_{IN}$ which defines the time duration of the positive and negative portions of the bi-level force applied to the coupling pistons 202 and 204 and thence to the water medium as a bi-level acoustic signal.

In operation, the pressure $P_B$ in the cavity 205 between the coupling pistons 202 and 204 is set higher than the ambient pressure of the surrounding water so that a continuous force $(P_B - P_A) A_P$ urges the pistons 202 and 204 apart. Outward motion of the pistons 202 and 204 causes the drive areas $A_D$ in the region 206 to approach each other. When the valve 219 switches the pressure in the region 206 to $P_R$, the force $(P_B - P_A)A_p$ accelerates the coupling pistons 202 and 204 in the outward direction rapidly, causing a corresponding high positive acoustic pressure in the medium. When the valve 219 switches the pressure in the region 206 to $P_S$, a force $P_S A_D$ is applied to the drive areas which moves the coupling piston 202 and 204 together. As long as the inward force $P_S A_D$ is greater than the outward force $(P_B - P_A) A_p$, the pistons 202 and 204 will accelerate toward each other resulting in a corresponding low negative acoustic pressure in the medium. The force in the outward direction is a compressive force on the medium and results in the positive acoustic pressure, while the force in the inward direction is a tensile force on the medium and results in the negative acoustic pressure. The compressive force is of greater amplitude than the tensile force and a bi-level signal is transmitted.

The positive force accelerating the pistons 202 and 204 outwardly (assuming that $P_R$ equals zero) is $$\hat{F}_+ = (P_B - P_A) A_P \tag{20}$$

The negative force which accelerates these pistons 202 and 204 inwardly is $$\hat{F}_- = -(P_B - P_A) A_P + P_S A_D \tag{21}$$

Substituting Equation (11) into Equations (20) and (21), the balance or equilibrium condition is $$P_B = P_S \frac{P_D}{A_P} \frac{K}{(K + 1)} + P_A \tag{22}$$

When K=2, as is the case for the bi-level signals illustrated in FIG. 2(b), rearranging Equation (22) results in the following equation $$(P_B - P_A)A_P = \tfrac{2}{3} P_S A_D \qquad (23)$$

Equation (23) shows that the force due to the pressurized gas in the cavity 205 on the pistons 202 and 204 which is in the direction to move them apart should be two-thirds of the hydraulic force on the pistons developed at the drive areas $A_D$ when the pressure in the region 206 is switched to $P_S$. The area and pressure relationship as set forth in Equation (23) will result in the bi-level signal illustrated in FIG. 2(b).

Referring to FIG. 12 there is shown a bi-level seismic signal source for land application. This source is similar to the source shown in FIG. 8 in that it uses a base plate 102 having a frame 109 supported thereon. A housing 300 which provides a reaction mass is mounted from the frame 109 by springs 104 and 105. Hydraulic actuation means are provided by switching the hydraulic pressure in a single region chamber 306 in the housing 300. The chamber is connected by a passage 339 to a three-way electrohydraulic valve 360 which is similar in operation to the valve 60 used in the source illustrated in FIG. 9.

A shaft 303 which is directly connected to the base plate 102 enters a bore in the housing 300 to define the chamber 306. The end of the shaft 303 defines a piston having a drive area $A_D$ for driving the base plate 102.

The balance equation for the source which is derived in a manner similar to Equation (17), is $$X = \frac{P_S A_D}{K_S(1 + K)} - \frac{M_{Sg}}{K_S} \qquad (24)$$

When balance is obtained, the average displacement X in Equation (24) vanishes and the equation rewritten in terms of the forces for balanced condition becomes $$P_S A_D = M_{Sg}(1 + K) \qquad (25)$$

For the bi-level signal illustrated in FIG. 2(b), where K=2, the positive force pulse being applied for one-third of the signal element deviation, the peak force applied to the ground through the base plate 102 is $$\hat{F}_+ = P_S A_D = 3 M_{Sg} \qquad (26)$$

In other words the peak force is three times the weight of the seismic mass.

The source shown in FIG. 12 illustrates the use of a housing 300 whose mass $M_S$ is supplemented by a member 315 of mass $M_V$ coupled to the housing 300 through a spring 314. This arrangement has the advantage of enabling the housing mass $M_S$ to be sized only larged enough to keep the accelerations of the housing within reasonable bounds so as not to affect the valve 360 or the cables and hoses attached thereto, while providing added positive force output. The additional mass may be part of the transport vehicle for the source. The spring 314 will then isolate the vehicle from the source vibration.

The peak force in a direction toward the interface (into the ground) is, in the case of FIG. 12, $$\hat{F}_+ = P_S A_D = 3(M_S + M_V)g \qquad (27)$$

Figure 13:
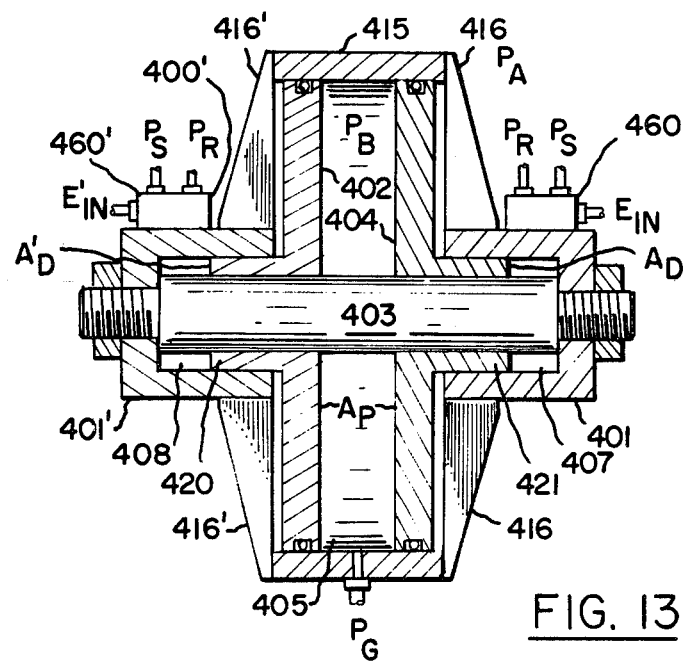
FIG. 13 is a sectional view diagrammatically showing a source in accordance with a still further embodiment of the invention, which source is adapted for use in marine environments.

Referring to FIG. 13 there is shown a marine source with coupling pistons 402 and 404 and hydraulic actuating means therefor symmetrically disposed with respect to each other. The pistons 402 and 404 are slidably mounted on a shaft 403 and face each other to define a cavity 405. This cavity is closed by a cylinder 415 in which the edges of the pistons slide. These edges are sealed by "O" rings. Alternatively the cavity 405 may be sealed by a boot, for example in the form of a bellows which is connected to the edges of the pistons 402 and 404.

The actuating means have cylindrical housings 401 and 401'. The outer ends of these housings are connected to the shaft 403 as by being held by nuts against steps on the shaft. Struts 416 and 416' attach the cylinder 415 to the housing cylinders 401 and 401'. Coaxial extensions 420 and 421 from the coupling pistons 402 and 404 are received in bores in the housing cylinders 401 and 401'. These extensions slide in the bores and on the shaft 403 and define annular chambers 407 and 408 in the housing cylinders 401 and 401'. The ends of the extensions 420 and 421 present piston drive areas to the chambers 407 and 408. Each of these chambers is a variable volume region which increases and decreases in volume as the hydraulic pressure therein is switched between supply and return pressure by three-way electrohydraulic valves 460 and 460'. The three-way valves 460 and 460' port the flow of the pressurized hydraulic fluid symmetrically into and out of the chambers 407 and 408 in accordance with the timing of the control signals $E_{IN}$ and $E_{IN}'$ which operate the valves.

As was explained in connection with FIG. 11, the pressure due to the gas in the cavity 405 is greater than the pressure of the water which surrounds the pistons. When the valve 460 and 460' simultaneously switch the pressure in the chambers 407 and 408 to return pressure $P_R$, the force $(P_B - P_A) A_P$ on the pistons 402 and 404 accelerate them apart and applies a positive or compressive force to the water medium. Then the pressures in the chambers 407 and 408 are switched by the valves 460 and 460' to supply pressure $P_S$. The net force on the pistons 402 and 408 becomes $(P_B - P_A) A_P - P_S A_D$ which is a force in the inward direction urging the piston 402 and 404 together. The magnitudes of the pressures and areas and the timing relationships of the switching are as set forth in Equations (1) and (2) and enable the pistons 402 and 404 to execute a stable oscillation cycle which produces the bi-level signals, as for example shown in FIG. 2(b). The symmetrical configuration enables the piston masses to be equal and reduces any unbalanced forces tending to create unwanted vibrations of the housings 401 and 401'. The use of two valves 460 and 461 also enables the power capacity of the source to be doubled over the source shown in FIG. 11.

FIGS. 14 to 17 illustrate sources which generate and transmit n-level signals. These sources enable the bi-level signal elements to be summed in one source so that one source rather than several in an array may be used in order to generate signals having a prescribed spectral shape over the band of interest. In the sources illustrated in FIGS. 14 and 17, n equals 6. This enables 6 signal elements to be summed. It will be appreciated that n may be a number other than 6 so as to correspond to the number of signal elements which are summed. In general, the number of levels n which can be produced by an n-level source is $2^V$, when V is the number of valves. The number of valves, V, may be chosen equal to the number of signals.

Each signal element may have independent timing through the use of hydraulic actuators which are separately controlled by different input signals. Accordingly, the signal elements may be time displaced for the purpose of cancelling or reducing unwanted components in the spectrum of the transmission. The amplitudes of the forces in each signal element may also be separately selected by using drive areas in the actuator sized corresponding to the selected force amplitudes. The illustrated sources use like drive areas so as to obtain equal positive forces in each signal element.

Figure 14:
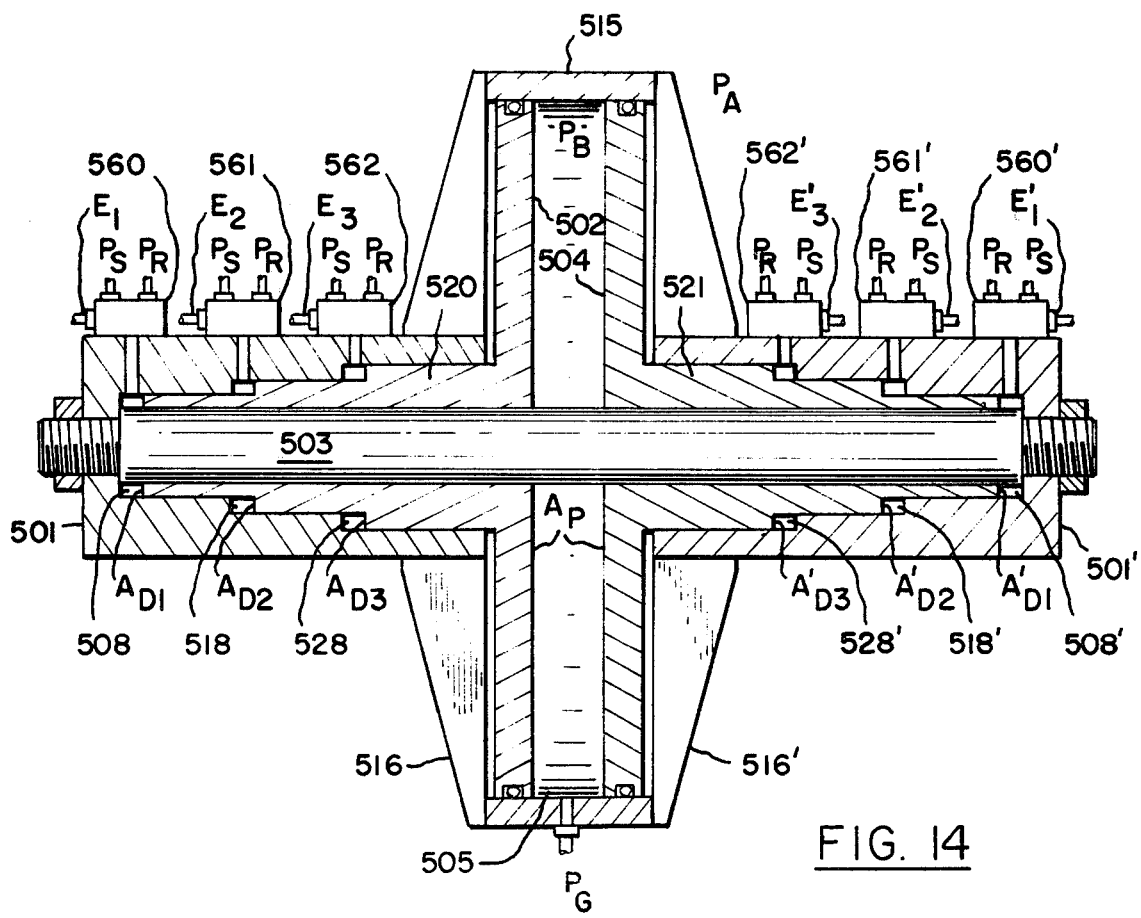
FIG. 14 is a sectional view diagrammatically showing a n-level seismic signal source adapted for use in marine environments, which source is provided in accordance with a still further embodiment of the invention.

Referring to FIG. 14 there is shown a marine source having a symmetrical configuration generally like that of the source illustrated in FIG. 13. Symetrically disposed piston coupling members 502 and 504 define a cavity 505 which is filled with pressurized gas from a source indicated as $P_G$ so that the pressure on the piston areas $A_P$ in the outward direction is greater than the forces due to the pressure $P_A$ of the surrounding water which tends to drive the coupling pistons 502 and 504 inwardly. The hydraulic acutating means are symmetrically disposed on opposite sides of the piston. These acutating means are provided by housings 501 and 501' which are attached to a shaft 503 on which the coupling pistons 502 and 504 are slidably mounted. The attachment of the housings is by means of steps on the shaft and nuts on the ends of the shaft 503 as described in connection with FIG. 13. Bores in each of the cylindrical housings 501 and 501' provide chambers around the shaft 503. Coaxial shafts 520 and 521 extend outwardly therefrom into the bores in the housing cylinders 501 and 501'. Steps on these extensions 520 and 521 provide piston areas $A_{D1}$, $A_{D2}$, $A_{D3}$ and $A_{D1}'$, $A_{D2}'$ and $A_{D3}'$. Corresponding steps in the bore form separate variable volume regions 508, 508', 518, 518' and 528, 528'. Each of these regions is filled with pressurized hydraulic fluid which is switched between supply and return pressures by three-way electrohydraulic valves 560, 560', 561, 561' and 562, 562'. Separate signals $E_1$ and $E_1'$, $E_2$ and $E_2'$, $E_3$ and $E_3'$ operate the valves to establish the switching times. The forces on the coupling pistons 502 and 504 can assume the states defined by the following equations, assuming $A_{D1} = A_{D1}'$, $A_{D2} = A_{D2}'$, etc.

$$\hat{F}_+ = (P_B - P_A)A_P - P_S(\delta_1 A_{D1} + \delta_2 A_{D2} + \delta_3 A_{D3}) \quad (28)$$

$$\hat{F}_- = -(P_B - P_A)A_P + P_S(\epsilon_1 A_{D1} + \epsilon_2 A_{D2} + \epsilon_3 A_{D3}) \quad (29)$$

In these equations, the $\delta_S'$ and the $\epsilon_S'$ can be 1 or 0, where 1 corresponds to supply pressure in the region 0 to return pressure therein. The symmetrically disposed pairs of regions (viz., 508 and 508', 518 and 518', and 528 and 528') are controlled so each pair is switched to supply pressure or return pressure at the same time. It is assumed in the Equations (28) and (29) that $P_R$ is equal to 0. If all of the drive areas are equal in size, $\hat{F}_+$ can range from $(P_B - P_A) A_P$ to $(P_B - P_A) A_P - 3 P_S A_D$. $\hat{F}_-$ can range from $-(P_B - P_A) A_P$ to $-(P_B - P_A) A_P + 3 P_S A_D$. Thus many force states are available with the n-level source. An array of n-level sources can also be used to achieve coherent gain in far field pressure.

Figure 15:
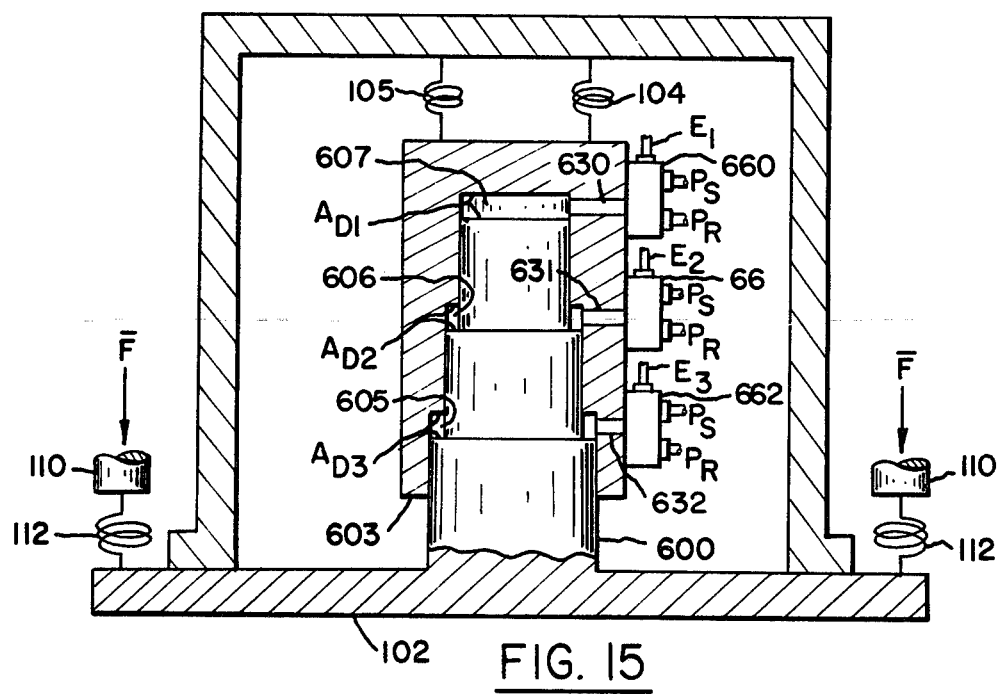
FIG. 15 is a sectional view diagrammatically showing a n-level seismic source for use on land in accordance with a still further embodiment of the invention.

FIG. 15 shows an n-level source for use on land. This source utilizes a base plate 102 and bias force applying means 110, 112, as described in connection with FIG. 8. A reaction mass housing 603 is supported on a frame 109 by springs 104 and 105. A stepped bore in the reaction mass housing 603 receives a piston shaft which is connected to the base plate 102. The piston shaft 600 also has steps corresponding to the steps in the bore. These steps define three variable volume regions 605, 606, and 607. The opposed ends of these steps define the drive areas $A_{D1}$, $A_{D2}$ and $A_{D3}$. Each of the variable volume regions is connected by a separate passage 630, 631 and 632 to a three-way electrohydraulic valve 660, 661 and 662. These valves switch the pressure in the regions between supply and return states. Such multiple switching yields the n-level force transmission while maintaining high power conversion efficiency associated with a pure switching rather than a flow metering action.

Figure 16:
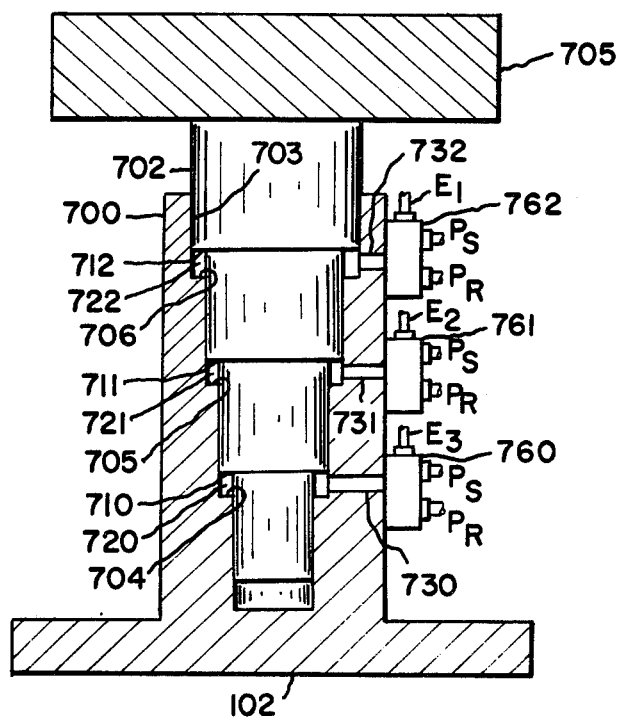
FIG. 16 is a sectional view diagrammatically showing a n-level seismic source for use on land in accordance with a still further embodiment of the invention.

Referring to FIG. 16, another land source is shown having a base plate 102 on which is supported a housing in the form of a cylinder 700 having a stepped bore 703 therein. A piston 702 having a seismic mass 705 attached thereto is slidable in the bore 703. Steps 704, 705 and 706 in the bore correspond to steps 710, 711 and 712 on the piston and define three variable volume regions 720, 721 and 722. Hydraulic fluid is switched between supply and return pressures by three-way electrohydraulic valves 760, 761, and 762 which are respectively connected to passages 730, 731 and 732 to the regions 720, 721 and 722. The mass 705 provides the static positive pressure against the interface between the ground and the base plate 102. Similarly with the other n-level sources, n force levels are generated by switching the pressure in the regions 720, 721 and 722. The drive areas $A_D$ in the sources illustrated in FIGS. 15 and 16 need not be equal to each other so as to obtain a larger variety of force states, if desired.

Figure 17:
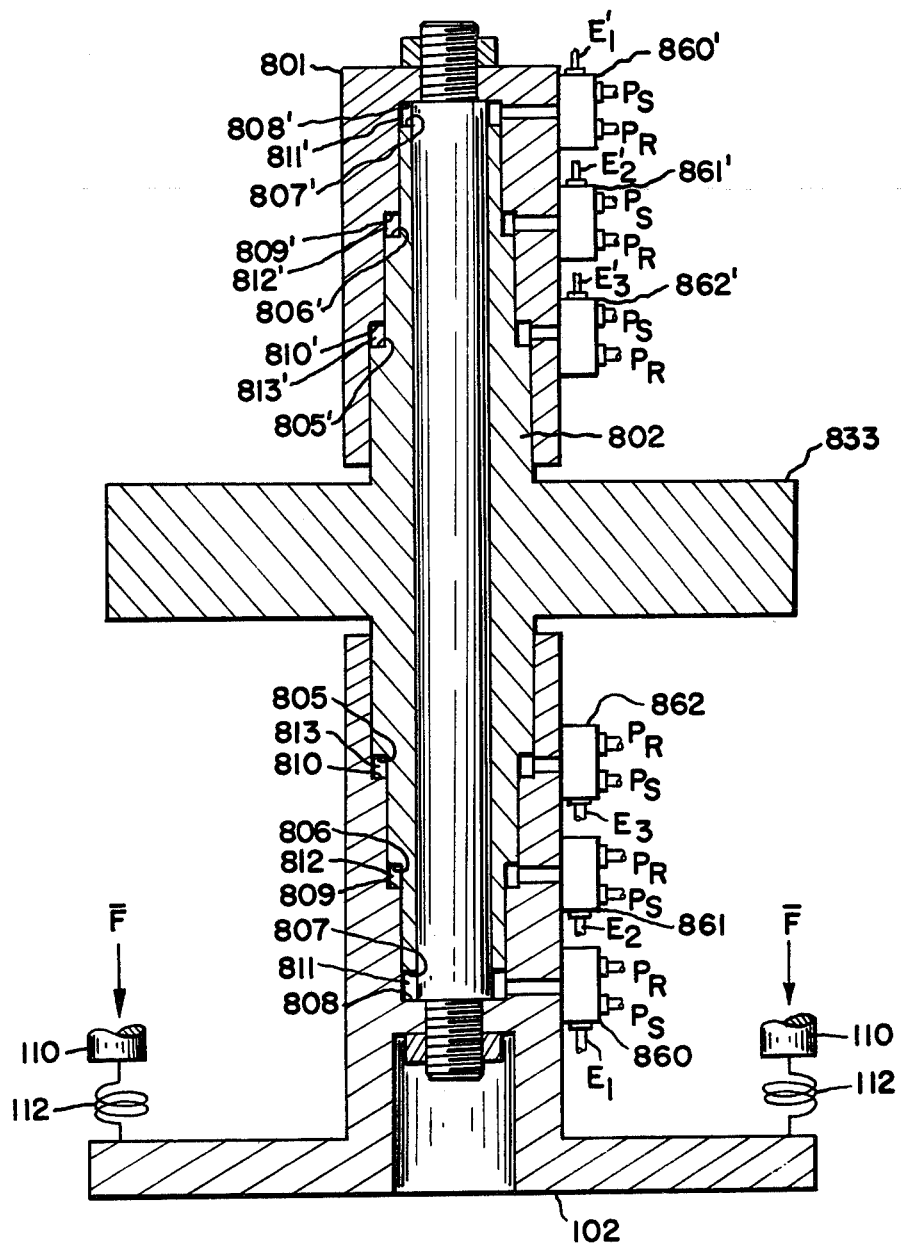
FIG. 17 is a sectional view diagrammatically showing a still further embodiment of a n-level seismic source for use on land in accordance with a still further embodiment of the invention.

Referring to FIG. 17 there is shown another n-level source which is adapted for use on land. A base plate 102 is biased against the ground bias forces $\overline{F}$ via shafts 110 and springs 112 as was the case for the source described in connection with FIG. 8. A shaft is secured to the plate as by means of a bolt on the lower step end of the shaft 803. Two cylindrical housings 800 and 801 are attached at opposite ends of the shaft 803. The lower housing 800 may be a cylinder coaxial with the shaft 803. This cylinder 800 is connected directly to the base plate 102. The upper cylinder 801 is connected to an upper stepped end of the shaft 803 as by means of a bolt. Another stepped end and bolt arrangement connects the lower end of the shaft 803 to the base plate 102.

These housing cylinders 800 and 801 have bores with correspondingly arranged steps 808, 808', 809, 809', and 810, 810'. The steps 808 to 810 in the lower cylinder 800 face in a direction away from the interface between the base plate 102 and the ground while the steps 808' to 810' face toward the interface. A piston 802 which is coaxial with the shaft 803 is slidable thereon. This piston has on opposite ends thereof correspondingly arranged steps 805 to 807 and 805' to 807'. Corresponding to steps 807, 808, 806, 809 and 805 and 810 on the lower cylinder and lower end of the piston 802 define variable volume regions 811, 812 and 813 in the bore of the lower cylinder 800. Similarly, variable volume regions 811',812', and 813' are defined in the bore in the upper cylinder 801. Separate three-way electrohydraulic valves 860, 861 and 862 switch hydraulic fluid in these chambers 811 to 813 between supply and return pressures. Similarly, separate valves 860', 861' and 862' switch the hydraulic fluid pressure in the regions 811', 812' and 813' between supply and return pressures. A seismic mass for developing reaction forces to drive the base plate 102 against the ground may be provided by a massive section 833 which is disposed on the piston 802 between the cylinders 800 and 801. Shafts 110 and isolating springs, as before provide for bias of the plate against the ground. By switching the pressures in the regions 811 to 813 and 811' to 813' in response to control signals $E_1$, $E_1'$, $E_2$, $E_2'$, $E_3$, $E_3'$ various force states of the signal may be transmitted into the ground.

In the above described sources the electrohydraulic valves which have been illustrated for controlling the flow switching are illustrative, and other valves, such as rotary valves, controlled, for example by stepping motors, may alternatively be used. Also while mechanical springs have been illustrated for centering the pistons and housings with respect to each other, pneumatic springs or active hydraulic centering means, having time constants long as compared to the longest period of the spectrum of interest, may alternatively be used.

From the foregoing description it will be apparent that there has been provided improved sources of acoustic signals. These sources may be used to generate and transmit seismic signals either in marine environments or on land. Variations and modifications in the hereindescribed sources will undoubtedly suggest themselves to those skilled in the art. Accordingly, the foregoing description should be taken as illustrative and not in a limiting sense.

What is claimed is:

1. For use in the transmission of a train of repetitive or quasirepetitive acoustic signals into a medium of finite tensile strength in response to an input control signal, the method of minimizing the negative dynamic pressure or stress excursions of said acoustic signals with respect to the average pressure or stress present in the absence of said signals and enabling the maximization of the power of said transmission in a given frequency band, said method comprising contacting said medium with a movable member, and applying in direct response to said control signal forces to said member in opposite directions with respect to the average force on said member due to said average pressure or stress to place said medium alternately under compressive and tensile forces with the time duration of the application of the compressive force short compared with the time duration of the application of the tensile force and with the waveform of said tensile forces being approximately rectangular in shape, said compressive force time duration being in excess of one-half period of the upper frequency limit of said frequency band, the lower frequency limit of said band being approximately the repetition frequency of said train of repetitive or quasirepetitive acoustic signals.

2. The method as set forth in claim 1 further comprising the step of controlling the amplitudes of said applied forces to cause the ratio of the amplitude of said compressive and tensile forces to be inversely proportional to the time durations thereof.

3. The method as set forth in claim 2 including the step of repeatedly applying said forces to provide a succession of repetitions of said compressive and tensile forces, changing the periods of each of said repetitions to sweep the frequency of said acoustic signals over at least a portion of said band.

4. The method as set forth in claim 3 including the step of changing the amplitude of said tensile forces in each said repetition whle the amplitude and duration of said compressive forces remains constant over said sequence.

5. The method as set forth in claim 3 wherein said changing step is carried out by changing the duration of both said compressive and tensile forces in each repetition while the amplitudes thereof remain constant over said sequence.

6. The method as set forth in claim 1 wherein said applying step includes the step of applying a static bias force to said member such that said tensile forces at the interface between said member and said medium are transmitted into said medium.

7. The method as set forth in claim 1 wherein said applying step is carried out by applying forces in said opposite directions to said member to place said medium under n levels of compressive and tensile forces.

8. The method as set forth in claim 7 including the step of individually controlling each of said forces.

9. For use in generating a train of seismic signals, in response to a train of input control signals, and for transmitting said signals into a medium, either land or water, a seismic signal source which comprises a housing having a chamber, a coupling member for radiating said signals into said medium, a piston connected to said coupling member, said piston being disposed in said chamber, said piston dividing said chamber into regions on opposite sides of said piston, means for applying a static force to said medium via said coupling member and for applying spring-like forces to said housing and coupling member for maintaining them at an equilibrium position with respect to each other, means responsive to said control signals for switching pressurized hydraulic fluid between said regions on opposite sides of said piston for applying switched forces, of duration corresponding to the duration of said control signals, via said piston to said coupling member during successive intervals of time one of which is short with respect to the other, which actuate said coupling member with greater acceleration toward said medium during said shorter period of time and with smaller acceleration away from said medium during said longer period of time, said periods of time being inversely proportional to said force durations whereby to generate and transmit said seismic signals with the positive pressure or stress of said seismic signals being larger in amplitude than the negative pressure or stress of said signals, with respect to the average pressure or stress in the medium in the path of transmission of said seismic signals therein.

10. For use in generating, in response to a control signal, acoustic signals such as seismic signals having energy within a predetermined frequency band and for transmitting said signals into a medium, a source of said signals which is operated by a flow of pressurized hydraulic fluid which is at supply and return pressures, said source comprising (a) at least one coupling member having a surface defining an interface with the medium, said member being movable in opposite directions at said interface;

(b) means coupled to said coupling member for applying to said member a static force directed toward said medium;

(c) hydraulically operated actuating means for said member including (i) at least one housing having a chamber for said pressurized hydraulic fluid, (ii) a piston in said chamber, said piston being connected to said coupling member and being movable in said opposite directions therewith, (iii) means for applying a force on said coupling member with respect to said housing for maintaining said housing at a equilibrium position with respect to said coupling member, (iv) said piston defining at least one variable volume region in said chamber, said piston having an area facing said region of such size that the force on said coupling member in the direction toward said interface when the hydraulic fluid in said region is at one of said supply and return pressures exceeds the force on said coupling member in the direction away from said interface when the hydraulic fluid in said region is at the other of said supply and return pressures, and (v) means responsive directly to said control signal for switching the hydraulic fluid pressure in said region to provide hydraulic fluid at said one of said pressures and at said other of said pressures during successive intervals of time, said interval of time when said hydraulic fluid in said region is at said one of said pressures being short as compared to said interval of time when said hydraulic fluid in said region is at the other of said pressures whereby the time duration of the force on said member in the direction toward said interface is less than the time duration of the force on said member in the direction away from said interface, said duration when the force on said coupling member is in the direction toward said interface being in excess of one-half period of the highest frequency in said band and the duration of the sum of said successive intervals of time being approximately one period of the lowest frequency in said band.

11. The invention as set forth in claim 10 wherein said actuating means further includes means for controlling said switching means to make the ratio of said time durations inversely proportional to the amplitudes of said forces.

12. The invention as set forth in claim 10 wherein said piston divides said chamber into first and second variable volume regions and having first and second areas respectively facing away from said interface and toward said interface, said first area being larger than said second area, means for communicating said hydraulic fluid to both said regions, said switching means being in communication with at least said first region for switching said pressurized fluid in said first region between supply and return pressures.

13. The invention as set forth in claim 12 wherein said source is an underwater seismic source, said medium being water, said coupling member is a second piston disposed in said housing and having a surface opposite to said interface defining surface which defines a second cavity in said housing, means for applying gas to said second cavity having a pressure approximately equal to the pressure of said water, said first and second areas being apportioned such that their ratio is equal to the ratio of the amplitude of said force in the direction toward said interface to the amplitude of said force in the direction away from said interface.

14. The invention as set forth in claim 10 wherein said source is adapted to operate under water and said piston divides said chamber into first and second variable volume regions, said piston having first and second areas of equal size facing toward and away from said interface, said coupling member being another piston, said housing defining with the surface of said other piston opposite to the surface which forms said interface a second chamber, and means for filling said second chamber with pressurized gas having a pressure in excess of the surrounding water pressure and sufficient to develop, with the pressure in said regions on said first and second areas, said forces in the direction toward said interface which exceed in amplitude said forces in the direction away from said interface.

15. The invention as set forth in claim 10 wherein said coupling member is a plate having a surface in contact with the earth which forms said interface, said housing being a reaction mass member having said chamber, said piston dividing said chamber into two variable volume regions, with first and second areas of said piston which face away from and toward said interface forming different ones of said regions, spring-like means supporting said housing over said plate, the ratio of said first and second areas being in predetermined relationship to the ratio of the amplitude of the force on said plate which is in the direction toward said interface and the force on said plate which is in the direction away from said interface, means for supplying pressurized hydraulic fluid to both said regions, and means for switching the fluid in at least that region formed by said first area between supply and return pressures.

16. The invention as set forth in claim 15 wherein the ratio of said areas is equal to the ratio of said forces.

17. The invention as set forth in claim 10 wherein said coupling member is a plate having a surface in contact with the earth which forms said interface, said housing being a reaction mass, spring-like means supporting said reaction mass from said plate, and means for applying a bias force to said plate of amplitude not less than the amplitude of the force in a direction away from said interface for developing said static force.

18. The invention as set forth in claim 17 wherein said bias force applying means includes second spring means connected to said plate for applying said bias force to said plate.

19. The invention as set forth in claim 17 wherein said bias force applying means comprises another mass separate from said housing and said plate, and third spring means for coupling said last named mass to said reaction mass.

20. The invention as set forth in claim 17 wherein said reaction mass has a bore therein, a shaft connected to said plate, and extending into said bore to define said piston and said variable volume region, one end of said bore which faces toward said interface being closed, the opposite end of said bore being closed by said shaft, said shaft having a portion perpendicular to the axis of said shaft which defines said area, the walls of said bore, said portion of said shaft and said end of said bore which faces toward said interface defining a single region in said reaction mass, and said switching means being in communication with said region for switching the pressurized hydraulic fluid therein between supply and return pressures.

21. The invention as set forth in claim 10 wherein said medium is water and source is adapted to be disposed under said water in a marine environment, said coupling member being a first driven piston having outer and inner surfaces, a second driven piston having inner and outer surfaces, said first and second driven pistons being movably mounted with their inner surfaces facing each other, means mounted along the edges of said first and second pistons and extending therebetween to define a variable volume chamber, coaxial shafts connected to said first and second driven pistons, with the inner one of said coaxial shafts having an enlarged section of diameter about equal to the diameter of the outer one of said coaxial shafts to define end areas on said coaxial shafts which face each other, a cylinder in which said outer shafts and said enlarged section are slidably mounted, said cylinder defining said housing, said chamber and variable volume region being defined in said second cylinder between said end areas of said coaxial shafts, said switching means being in communication with said region, and means for filling said cavity between said pistons with gas at a pressure exceeding the pressure of said medium.

22. The invention as set forth in claim 10 wherein said medium is water and said source is adapted to be disposed under water in a marine environment, having a shaft, a pair of coupling members in the form of second and third pistons coaxial with said shaft and slidably mounted thereon for movement toward and away from each other, said pistons having inner surfaces which face each other and outer surfaces which face said medium and define interfaces therewith, a cylinder disposed around the edges of said second and third pistons, said cylinder and the surfaces of said second and third pistons which face each other defining a first cavity, a pair of housings in the form of second and third cylinders having a pair of chambers therein, said cylinders being symmetrically disposed on said shaft outwardly from said second and third pistons, said second and third pistons each having an extension which is received in said second and third cylinders and which present drive pistons in said chambers which define separate variable volume regions, and a pair of said means for switching said hydraulic fluid in communication with said regions for switching the pressure of said hydraulic fluid in said regions between supply and return pressures, and means for filling said first cavity with gas at a pressure exceeding the pressure of said medium.

23. The invention as set forth in claim 22 wherein said cylinders each have a plurality of steps and said extensions have a corresponding plurality of steps which define a plurality of said regions, and a plurality of said switching means each in communication with a different one of said regions for separately switching the said hydraulic fluid in said regions between supply and return pressures for developing a plurality of said forces in directions toward and away from said interfaces.

24. The invention as set forth in claim 10 wherein said coupling member is a plate adapted to make contact with the earth along a surface which defines said interface, a housing supported upon said plate having a chamber, a piston in said chamber, said piston and housing being slidably movable with respect to each other in opposite directions toward and away from said interface, each having a corresponding plurality of steps which define a plurality of said regions in said housing, and a plurality of said switching means separately communicating with different ones of said regions for switching the hydraulic pressures therein between supply and return pressures for developing a plurality of said forces in directions toward and away from said interface.

25. The invention as set forth in claim 24 wherein said piston is attached to said shaft and said housing is a reaction mass yieldably supported on said plate.

26. The invention as set forth in claim 24 wherein said housing is a cylinder attached to said plate and extending from said plate away from said interface, said piston is a rod slidable in said cylinder, and a seismic mass attached to said piston for providing said static pressure.

27. The invention as set forth in claim 10 wherein said coupling member is a plate having a surface adapted to contact the earth to define said interface, a shaft connected to said plate and having an axis perpendicular to said surface, a pair of housings in the form of cylinders coaxial with said shaft and attached thereto with said cylinders being separated from each other, the inner peripheries of said cylinders each having a corresponding plurality of steps which face in opposite directions, the steps in one of said cylinders facing away from said interface and the steps in the other of said cylinders facing toward said interface, a piston slidably mounted on said shaft and disposed in said cylinders, the outer periphery of said piston which is disposed in said one of said cylinders having a plurality of steps corresponding to the steps in said one of said cylinders and which faces toward said interface and the outer periphery of said piston which is disposed in said other of cylinders having a plurality of steps corresponding to the steps in said other of said cylinders and which face away from said interface, said corresponding steps defining a first plurality of said regions in said one of said cylinders, and a second plurality of said regions in said other of said cylinders, a first plurality of said switching means communicating with said first plurality of said regions, and a second plurality of said switching means communicating with said second plurality of said regions.

28. The invention as set forth in claim 27 wherein the section of said piston between said cylinders is a massive member.

29. A seismic source operated by pressurized hydraulic fluid for transmitting seismic signals having n amplitude levels into a medium where n is an integer greater than one, said source comprising
a housing having a bore,
a piston reciprocally movable in said bore,
One of said housing and said piston having a coupling member at one end thereof, said member being arranged to contact said medium,
said piston and bore each having V steps which are spaced longitudinally of each other, one of said piston and housing steps facing in a direction away from said medium,
said steps defining with said bore and said piston wall V chambers in said bore, and
V control valve means for applying said pressurized hydraulic fluid at supply and return pressures in predetermined sequence to said chambers, whereby the number of levels n, equals $2^V$.

30. The invention as set forth in claim 28 wherein a pair of said coupling members, pistons and housings are provided, said coupling members being connected to different ones of said pistons, said housing being fixed and one of said pair of said coupling members, pistons and housings being disposed on an opposite side of a plane of symmetry from the other of said pair of said coupling members, pistons and housings.

31. The invention as set forth in claim 29 wherein one of said piston and housing comprises a reaction mass.

* * * * *

UNITED STATES PATENT AND TRADEMARK OFFICE
CERTIFICATE OF CORRECTION

PATENT NO. : 4,207,962
DATED : 6/17/80
INVENTOR(S) : John V. Bouyoucos

It is certified that error appears in the above-identified patent and that said Letters Patent are hereby corrected as shown below:

In Equation (4) on Column 6 approximately at line 44, $$\left( \frac{T_3 - T_2}{T_3 - T_2} \right) \quad \text{should be} \quad \left( \frac{T_3 - T_2}{T_3 - T_1} \right)$$

Signed and Sealed this

Third Day of February 1981

[SEAL]

Attest:

Attesting Officer

RENE D. TEGTMEYER

Acting Commissioner of Patents and Trademarks